United States Patent [19]

Coburn et al.

[11] Patent Number: 4,687,559
[45] Date of Patent: Aug. 18, 1987

[54] TREATMENT OF RESIDUES FOR METAL RECOVERY

[75] Inventors: Arthur E. Coburn; Roger Deal, both of Blackfoot, Id.

[73] Assignee: Helsco Metals Inc., Canada

[21] Appl. No.: 692,805

[22] Filed: Jan. 18, 1985

Related U.S. Application Data

[63] Continuation-in-part of Ser. No. 590,410, Mar. 16, 1984, abandoned.

[51] Int. Cl.$^4$ ............................ C25C 1/20; C25C 1/22; C22B 11/08
[52] U.S. Cl. .................................... 204/110; 75/99; 75/101 BE; 75/105; 75/118 R; 75/121; 423/31
[58] Field of Search ............................ 75/99, 105–107, 75/101 BE, 118 R, 121; 204/109, 110; 423/29–31

[56] References Cited

U.S. PATENT DOCUMENTS

| | | | |
|---|---|---|---|
| 2,648,601 | 8/1953 | Byler et al. | 75/106 |
| 2,777,764 | 1/1957 | Hedley et al. | 75/105 |
| 3,242,090 | 3/1966 | Grunwald | 75/105 |
| 3,357,823 | 12/1967 | Tuwiner | 75/105 |
| 3,826,723 | 7/1974 | Woods et al. | 204/110 |
| 3,992,511 | 11/1976 | Waehner et al. | 75/105 |
| 4,092,154 | 5/1978 | Dietz, Jr. et al. | 75/107 |
| 4,267,159 | 5/1981 | Crits | 423/29 |
| 4,384,889 | 5/1983 | Wiewiorowski et al. | 75/106 |

Primary Examiner—John F. Niebling
Assistant Examiner—Terryence Chapman
Attorney, Agent, or Firm—Sughrue, Mion, Zinn, Macpeak, and Seas

[57] ABSTRACT

This invention relates to a hydrometallurgical process for recovering the values contained in metallurgical residues, such as anode mud. In the first step of the process the residue is leached with an alkali carbonate bearing cyanide solution in the presence of an oxidizer, with agitation. The resulting pregnant solution is separated from the barren solids, and subsequently treated for the recovery of the value metals. In the preferred embodiment the recovery is conducted in an electrolytic cell, but known ion exchange processes are equally suitable. The reagent solution is then passed through an ion exchange system to remove trace metal residuals, impurities and degradation products. Next the original chemical composition of the now barren extractant is restored by chemical replenishment or addition, and the regenerated reagent is recirculated for contact with fresh residue and oxidizer. The process times of the present invention are quite rapid and due to the closed loop concept little or no effluents are involved. Moreover, the cyanide requirements are kept to a minimum due both to the closed loop and to the fact that the cyanide is largely recovered from the metallic complex during the electrolytic step.

6 Claims, 2 Drawing Figures

FIGURE 2. MODIFIED CLOSED LOOP CYANIDATION PROCESS

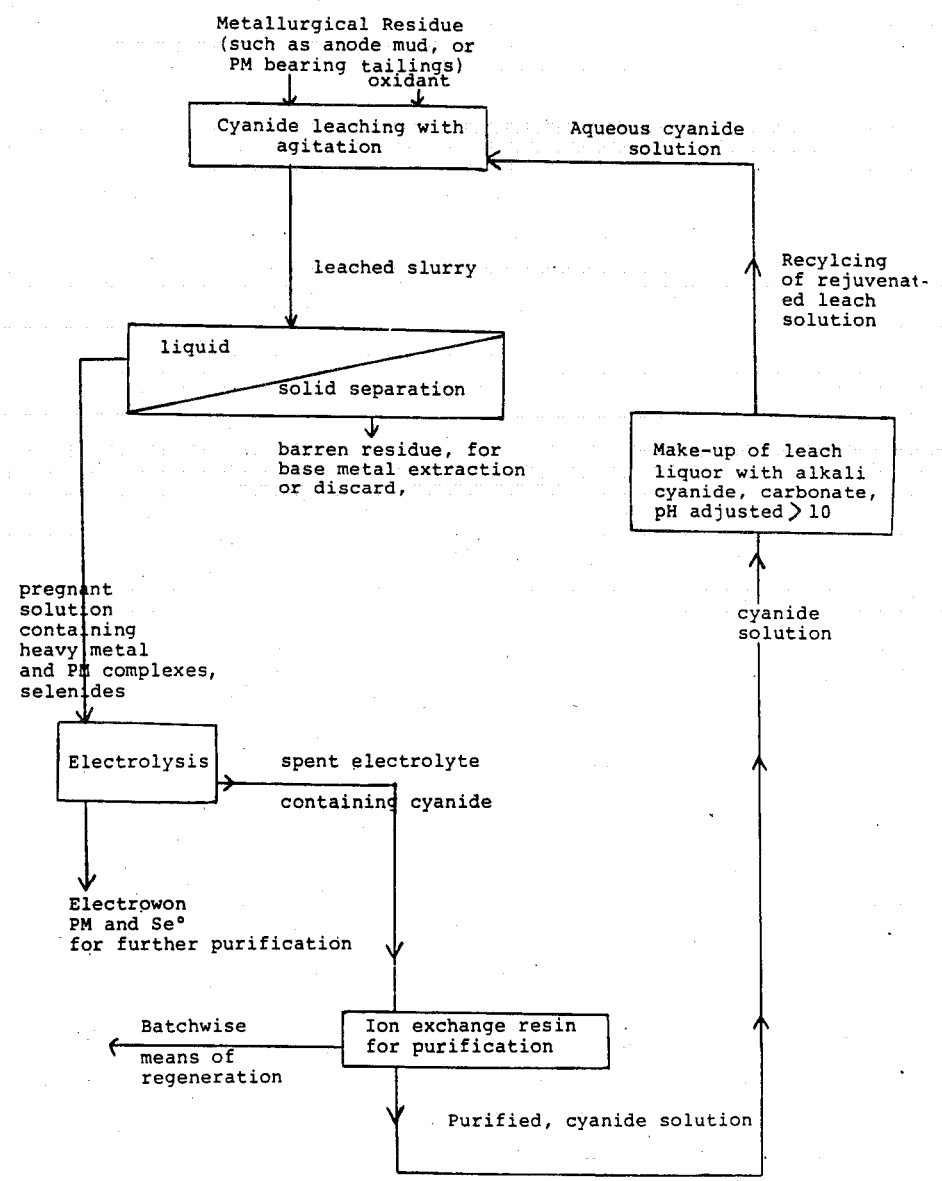
FIGURE 1 CLOSED LOOP CYANIDATION PROCESS

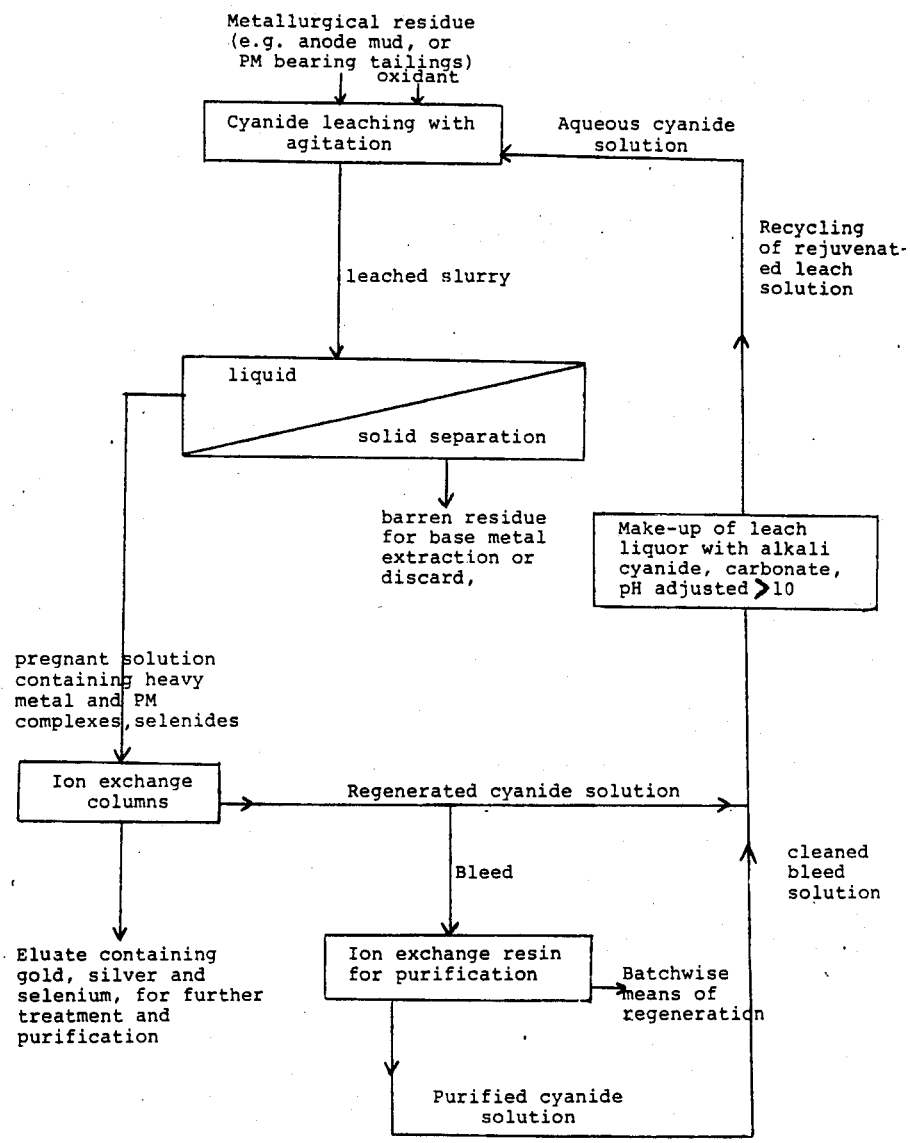
FIGURE 2, MODIFIED CLOSED LOOP CYANIDATION PROCESS

TREATMENT OF RESIDUES FOR METAL RECOVERY

This application is a continuation-in-part of Ser. No. 590,410 filed 3/16/84 and now abandoned.

FIELD OF THE INVENTION

This invention relates to the treatment of metallurgical residues and the recovery of valuable components therefrom in a manner which is both faster and ecologically safer than conventional processes. More particularly, this invention describes a close-loop hydrometallurgical process for the recovery of valuable components such as gold, silver and selenium by cyanidation from residues such as anode mud, anode slime or tailings.

BACKGROUND OF THE INVENTION

During the refining of metals, such as copper and other non-ferrous metals, the electrolytic process produces a residue known as anode mud or anode slime. The mud (slime) typically contains valuable elements such as gold, silver and selenium. In addition, there are commonly practiced hydrometallurgical extracting processes where the leaching of base metals leads to precious metal bearing residues which can be further treated for gold and silver recovery. These metallurgical residues are in some instances further treatable with acid leaching in the presence of very strong oxidizing agents to recover the valuable metals. This however, inevitably leads to dissolution of nearly all the metals and hence to expensive separation processes. A further complication is that a separate process is required to recover the selenium contained in the residue. Tailings from mineral processes could also bear precious metals which are economically recoverable.

DISCUSSION OF PRIOR ART

A well known process for the recovery of gold and silver from residues is a cyanidation process which is usually carried out in mildly alkaline solutions to avoid the escape of toxic hydrogen cyanide. Such a process is taught in U.S. Pat. No. 702,305 wherein the cyanidation of precious metals is conducted in the presence of potassium carbonate but without the addition of any oxidant. In this process no consideration is given to the toxid nature of the effluent. Another process taught by U.S. Pat. No. 718,633 describes the cyanide leaching of gold and silver in the presence of hydrate of calcium and carbon dioxide; and with compressed air to oxidize the metals to lead to soluble cyanide complex formation. U.S. Pat. No. 1,198,011 teaches cyanidation conducted in a special vessel where compressed air is introduced for oxidation, and above atmospheric pressure is maintained in the vessel. U.S. Pat. No. 4,401,468 teaches another cyanidation process for the precious metals contained in sulphidic and oxidic ores and residues in the presence of lime or sodium hydroxide and carried out in special apparatus wherein the slurry is subjected to compressed air, in a vessel which is equipped with a nozzle. The vessel taught has a recycling unit preceding the liquid solid separation of the process to prolong the action of compressed air. There is no attempt in this process to reuse the cyanide after the complexed precious metals have been removed, nor to avoid contamination of the environment by the toxic reagents in the effluent.

SUMMARY OF INVENTION

An improved method has now been found for extracting gold, silver together with selenium, from metallurgical residues such as anode mud or slime, precious metal bearing leach residues and tailings, by solubilizing in cyanide the valuable metals contained therein in an alkaline solution stabilized with alkali carbonate, and with controlled oxidation with hydrogen peroxide, and wherein the cyanidation is accomplished in an agitated vessel. The pregnant solution resulting from the cyanidation is then separated from the insoluble solids, and the gold, silver and selenium are recovered while the cyanide reagent is regenerated. The cyanide solution is subsequently cleaned by known methods, brought up to the desired cyanide and carbonate concentration and returned to leach fresh residue.

By another aspect of the invention the rate of complexing by cyanide is enhanced thereby diminishing the attendant oxidation of the leachent and allowing repeated use of the cyanidation reagent by recycling.

Another aspect of the invention is to separate the precious metal components from base metals contained in metallurgical residues and to return the base metals for further processing.

Yet another aspect of this invention is to produce high purity selenium for use in the electronics industry.

This invention will be better understood from the following disclosure and the attached drawings.

BRIEF DESCRIPTION OF DRAWINGS

FIG. 1 is a diagramatic flow sheet describing the steps of the close loop cyanidation process of the invention.

FIG. 2 shows a minor variation of the same process.

DETAILED DESCRIPTION OF PREFERRED EMBODIMENT

Cyanidation for the extraction of gold, silver and other metals has been a long practiced process within the metallurgical industry. The advantages of preferentially solubilizing gold and silver and thereby separating the valuable metals from the base metals are, however, considerably diminished by the toxic effects of the reagents and the costs of avoiding damage to the environment.

The chemical reactions in cyanidation of precious metals are summarized as follows:

$$2Ag + 4NaCN + \tfrac{1}{2}O_2 + H_2O \rightarrow 2NaAg(CN)_2 + 2NaOH \quad (1)$$

$$2Au + 4NaCN + \tfrac{1}{2}O_2 + H_2O \rightarrow 2NaAu(CN)_2 + 2NaOH \quad (2)$$

Base metals which accompany the gold and silver, also react with cyanide; these are however, precipitated by the excess of this reagent.

Selenium will also be solubilized by cyanide according to the reaction described in various textbooks:

$$Se + NaCN \rightarrow NaSeCN \quad (3)$$

This is only a broad indication of the reaction and the exact mechanism is not yet known.

Under oxidizing conditions the aqueous cyanide will become cyanate, described by the reaction;

$$NaCN + \tfrac{1}{2}O_2 \rightarrow NaCNO \quad (4)$$

Cyanate is less harmful and toxic but is not capable of solubilizing precious metals.

The conventional cyanidation processes are carried out without added oxidants and with little agitation, in mildly alkali solutions to reduce toxicity, and for prolonged reaction periods, such as 20-30 hours. In addition, after the dissolved silver and gold are recovered from the pregnant solution, the reagents in the solution are too dilute to be reused and their elimination from the effluent adds to the cost of the cyanidation process. A process which would solubilize only gold and silver and selenium, without oxidizing the reagents, hence allowing the latter to be reused without discharging in the effluent, and which could be carried out at a rate which is economical, would enable the metallurgical industry to utilize the advantages of cyanidation without its inherent disadvantages.

According to the present invention, by controlling the conditions of cyanidation, a fast method of extracting gold, silver and selenium has been found, which also allows the recycling and reuse of the reagent, thus avoiding harmful effluents. Furthermore, all the cyanide that is separated as precipitate, is either destroyed or regenerated for further use.

The process described below can be employed to extract gold, silver, selenium from precious metal bearing metallurgical residues, such as anode mud (anode slime) which collects as very fine deposit during the electrolytic refining of copper, nickel and cobalt, or similar metals. Residues bearing gold, silver and selenium which result from leaching operations, can also be treated by this method. Gold, silver and any selenium present in various flotation tailings will also respond to the present treatment. It should be clear to those familiar with the art, the specific reagent ratios and the amounts of oxidant required in the process described hereinbelow will be dictated by the nature and origin of the residue, the amount of base metals accompanying the gold, silver and selenium, and other economic and marketing considerations.

The process is diagramatically represented in FIG. 1, and the steps comprising it will be described in detail in the following sections.

(A) *The residue is reacted* with alkali cyanide and alkali carbonate, in an agitated container and with oxidation, with an oxidant solution added in the requisite amounts.

The stoichiometric requirements of alkali cyanide for the leaching of silver, gold and selenium contained depend on the nature of the residue, as discussed above, and is also dependent upon the good rate and on the pulp density. At least 20% above stoichiometric requirements is maintained to ensure constant excess and allow for feed metal concentration variations. The amount of alkali carbonate required is also dictated by the nature of the ore; in general it should be sufficient to maintain the pH of the slurry in excess of 10. The preferred alkalinity is around a pH 11, and generally a 10% carbonate solution strength has been found satisfactory in the process.

The oxidant is added in the form of aqueous solutions, such as 35% hydrogen peroxide. The rate of addition of the oxidant relative to the concentration in the leach liquor is very important, and is critical to the successful extraction, and utilizing of the cyanide. Hydrogen peroxide is destroyed or consumed by cyanide. Therefore the addition must be on a minimal yet continuous basis to ensure that the bulk of the atomic oxygen enters directly into the desired cyanidation reaction. The solution concentration utilized in the present process is generally in the range of 0.9 to 1.2% for corresponding pulp densities of 25-50%. It should be understood however, that this again depends on the nature of the residue to be extracted.

The residue slurried in the solution bearing the above reagents and the oxidant is reacted in an agitated reactor. Flotation cells, such as a Denver 18 or a Denver 21 used without any froth removal, were found to be most useful for the leaching but any other apparatus operating on the same principle can be used. Under such conditions gold, silver and selenium are solubilized to a very high degree, within 10-20 minutes. Market considerations will dictate the limit of precious metal extraction for a given residue, but to achieve the maximum economic extraction with the least oxidation of the reagent, a second extraction period with fresh reagent in a second cycle, may be beneficial. It was found that leaching gold, silver and selenium in two 10-minute reaction periods with agitation and fresh reagents, will produce close to 99% extraction of the available valuable metals; this was found to preferential to one 20-minute leaching period. The exact condition for achieving optimum results have to be decided for each metallurgical residue to be handled.

The leach steps can be carried out continuously or in batch manner. In the continuous mode the residue, and leachant are fed into the reactor at a fixed rate. The oxidant is added to the system at the point of contact between leachant and feed. This reagent is wholly consumed and hence it is continuously added at a fixed rate during the leach step.

(B) The leaching step is followed by a *solid-liquid separation* step. The slurry of the pregnant solution and the non-leachable solids from the reactor is passed through a filtration unit. The solid products usually consist of the primary base metal constituents present in the feed and include residuals of gold, silver, selenium and the platinum group metals; if the residue treated originated as anode mud. Silicates, sulphides, barren rock constituents, and similar compounds which are not leachable by cyanide will also be retained in the solids. These solids are washed and the wash water treated separately to extract valuable metals contained, and to regenerate cyanide. The separated solids are usually treated by conventional pyrometallurgical processes for base metal recovery. If the residue treated originates as tailings, the washed solids can be discarded.

(C) The pregnant solution bearing the valuable components is then passed to the *recovery step*. In the embodiment shown in FIG. 1, the recovery from clarified pregnant solution is carried out in one or more electrolytic cells in series. The gold, silver and selenium are reduced to the zero oxidation state at the cathode, to be subsequently recovered either singularly or as a conglomerate product for further refining and processing. In the electrolytic reduction, the cyanide ions forming the metallic complexes are released at the anode, thus are regenerated for reuse in subsequent leaching. The regenerated cyanide bearing spent electrolyte is removed from the cell, usually by means of an overflow.

In another embodiment of this process shown in FIG. 2, the recovery of the valuable metals and the regeneration of the cyanide reagent are conducted in an ion-exchange recovery unit.

(D) With the bulk of the gold, silver and selenium values removed, the barren solvent passes through a polishing *ion exchange system* where trace metal residues, solvent degradation products and soluble heavy metal complexes are removed. The ion exchange system that can be usefully employed in this step may be a combination of fixed-bed and moving bed arrangement, as required. The trace metal residuals could be combined with a metallic product from the electrolytic step or treated separately, as dictated by the composition and volumes. The degradation waste product are neutralized with regards to toxicity and then discarded. These are usually small volume waste residues. A commercially available strong-base ion exchange resin may work satisfactorily in this step.

In cases of relatively low residual and heavy metal concentrations in the regenerated cyanide solutions, only a bleed is taken through the polishing ion exchange system. Such modification is shown in FIG. 2.

The wash water of the non-leachable solids from the filtration step, may also be treated in this polishing ion-exchange unit.

(E) The totally barren and now cleaned solution from the polishing ion-exchange unit of the previous step, is *made up to original strength* by the addition of the appropriate chemicals, for completing the loop of the cyanidation cycle described. Chemical replenishment or addition is conducted in a mixing tank equipped with the appropriate analytical sensing devices. This tank will also serve as a buffer container for fluctuations or flow rate changes in the entire cycle. The rejuvenated solution is then passed to step A, to leach fresh residue.

EXAMPLE 1

A commercially available sample of anode mud containing 250 oz./T gold and 11,750 oz./T silver, along with copper, selenium, lead, silicon together with the usual impurities, was slurried in a solution containing about 6.7 wt % sodium cyanide and 3.4 wt % sodium carbonate. The anode mud slurry was mixed in a ratio of 1 ton of mud to 200 gallons of solution. The pH of the slurry was 11.4. A solution containing 35% hydrogen peroxide was added to this slurry in an amount sufficent to maintain an average of 0.12% hydrogen peroxide concentration, based on the total volume of the solution. The leaching was carried out in a Denver 18 flotation cell without froth removal, and continuously agitated during the 10 minutes residence time. The slurry was then removed, filtered and the solids, consisting mainly of base metal oxides and precipitated cyanides, were washed and treated for base metal recovery in a conventional pyrometallurgical manner. Filtration was carried out with ease, without slime formation, followed by washing of the solids.

The pregnant solution from the solid-liquid separation was passed through a conventional electrolytic cell wherein the gold, silver and selenium were deposited at the cathode and the cyanide was regenerated on a large surface anode. The flow-rate, as those familiar with the art will know, was adjusted to the geometry of the cell, the total anode surface, and the cyanide concentration. The deposited metal and selenium were collected for purification in a conventional manner.

The regenerated cyanide solution was passed through an ion-exchange system where the soluble copper and iron cyanide complexes were removed together with the residual gold, and silver cyanides which had not been precipitated by the preceding electrolysis. The metal complexes in the so-called polishing step were collected at intervals and subsequently treated for separate metal and cyanide recovery.

Cyanide complexes contained in the wash water from the solid filtration step were also treated separately in the polishing ion-exchange columns.

The cleaned solution was then passed to a vessel where its concentration with respect to sodium cyanide and sodium carbonate was adjusted to the level in the cyanide leach liquor and then passed to the Denver cell to leach fresh anode mud.

The recovery of precious metals and selenium in this simple circuit was 70% for silver, 38% for gold and in the order of 40% for selenium.

EXAMPLE 2

The solids from the liquid-solid separation of Example 1 following the leaching of the anode mud, were passed into another Denver 18 flotation cell without froth collection, for a second leach with the rejuvenated solution of Example 1. 35% hydrogen peroxide was again added to give a 0.1% level and the solid content of the slurry was adjusted to have similar ratio to that of Example 1. This slurry was leached with agitation and in a residence time of 10 minutes.

The filtration steps and the subsequent process steps were the same as Example 1. In the present example, only a bleed of approximately ⅓ of the total volume of the regenerated cyanide solution was passing through the polishing ion-exchange resin. The regenerated cyanide solutions were mixed together and made up to contain the required cyanide and carbonate levels for subsequent use in leaching fresh mud.

The electrolytic products of both Examples 1 and 2 were combined and analyzed, giving a total recovery of gold and silver in excess of 99% based on the initial gold and silver contents of the anode mud. The total selenium recovery was around 50%. The gold, silver and selenium were further separated and purified in the conventional manner.

Our cyanidation process is described above in such terms as to enable those skilled in the art to which it pertains to understand and practice it.

Having defined the preferred embodiment thereof, we claim:

1. A process for the extraction of at least one of gold, silver and selenium values contained in metallurgical residues, comprising the steps of:
   (a) reacting a metallurgical residue slurred with an extractant solution of alkali metal cyanide and carbonate reagents, said reacting being performed in the presence of hydrogen peroxide, and in an agitated vessel at a pH in excess of 10, to yield a solution pregnant with at least one of gold, silver and selenium, and barren residue;
   (b) separating the pregnant solution from the barren residue;
   (c) recovering at least one of gold, silver and selenium from the pregnant solution, and regenerating the cyanide reagent;
   (d) removing residual gold, silver, selenium and solubilized impurities by an ion exchange cleaning process from the regenerated cyanide reagent;
   (e) bringing the concentration of the regenerated cyanide reagent to the desired level by alkali metal cyanide and carbonate addition; and
   (f) returning the reagent solution resulting from step (e) to step (a) to extract fresh residue.

2. A process according to claim 1, wherein the alkali metal cyanide and the hydrogen peroxide concentrations of the extractant solution are adjusted to be consistent with maximum extraction of gold, silver and selenium, and minimum oxidation of cyanide in extracting the residue in an agitated vessel.

3. A process according to claim 2, wherein the extraction is conducted in a continuous, closed-loop manner.

4. A process according to claim 1, wherein the recovery of gold, silver and selenium from the pregnant solution in step (c) is carried out by electrolysis in an electrolytic cell including a cathode, an anode and electrolyte, by depositing the metals at the cathode and regenerating the cyanide reagent at the anode.

5. A process according to claim 1, wherein the recovery of gold, silver and selenium from the pregnant solution in step (c) is carried out by an ion exchange process and the cyanide reagent is regenerated and passed to step (d) according to known methods.

6. A process according to claim 1, conducted in a batchwise manner.

* * * * *